United States Patent [19]

Nowak et al.

[11] Patent Number: 5,665,787
[45] Date of Patent: Sep. 9, 1997

[54] LOADED SYNTACTIC FOAM-CORE MATERIAL

[75] Inventors: Gregory P. Nowak, Belleville, Ill.; Alan F. Tegeler, O'Fallon; Tracy L. Timmons, Maryland Heights, both of Mo.

[73] Assignee: McDonnell Douglas Corporation, St. Louis, Mo.

[21] Appl. No.: 480,778

[22] Filed: Jun. 7, 1995

[51] Int. Cl.$^6$ .................... C08J 9/28; C08J 9/32; C08J 9/35

[52] U.S. Cl. .................. 521/54; 521/63; 521/64; 521/154; 521/178; 521/184; 523/218; 523/219

[58] Field of Search .................... 521/54, 63, 64, 521/154, 178, 184; 523/218, 219

[56] References Cited

U.S. PATENT DOCUMENTS

| | | |
|---|---|---|
| 3,849,350 | 11/1974 | Matsko ........................ 521/54 |
| 3,856,721 | 12/1974 | Fritschel ...................... 521/54 |
| 4,410,639 | 10/1983 | Bouley et al. . |
| 4,412,012 | 10/1983 | Bouley et al. . |
| 4,482,590 | 11/1984 | Bouley et al. . |
| 4,548,861 | 10/1985 | Barnes et al. . |
| 4,568,603 | 2/1986 | Oldham . |
| 4,595,623 | 6/1986 | Du Pont et al. . |
| 4,861,649 | 8/1989 | Browne . |
| 4,956,393 | 9/1990 | Boyd et al. . |
| 5,120,769 | 6/1992 | Dyksterhouse et al. . |
| 5,135,959 | 8/1992 | Hill . |
| 5,167,870 | 12/1992 | Boyd et al. . |
| 5,185,381 | 2/1993 | Ruffoni . |
| 5,252,632 | 10/1993 | Savin . |
| 5,356,958 | 10/1994 | Matthews . |

*Primary Examiner*—Morton Foelak
*Attorney, Agent, or Firm*—Howell & Haferkamp, L.C.

[57] ABSTRACT

A syntactic foam-core material and method for its production are disclosed wherein glass microspheres and chopped fiberglass are dispersed within a slurry comprised of a suitable resin such as an epoxy and a suitable solvent such as methyl ethyl ketone. Under carefully controlled vacuum and rate of addition conditions, the microspheres and chopped fiberglass are added to the slurry to form a light weight syntactic foam-core material. The material may either be stored under cold conditions for use at a later time or it may be shaped and/or molded to conform to a desired configuration which, for example, may correspond with a desired component part. After curing, the material may be machined to final dimensions.

4 Claims, 2 Drawing Sheets

LOADED SYNTACTIC FOAM-CORE MATERIAL

BACKGROUND OF THE INVENTION

This invention relates, generally, to a syntactic foam-core composite and, more particularly, to a syntactic foam-core material characterized by ultra-low density, broad temperature range utility, electromagnetic attenuation tailorability, low cost and convenient manufacture.

Foam-core composites are used widely in industry in an array of practical applications. For example, because of the light weight and expanded cellular structure which characterize these materials, they are used extensively as thermal, electrical and acoustical insulators and as filler materials.

Further, a trend has developed to substitute lighter and less dense materials such as aluminum and related alloys in structural applications which once required iron and steel. This trend continues in that lower density synthetic materials and composites which are desirable due to their strength and resistance to impact are now being combined with and often substituted for structural materials such as aluminum and metal alloys. In this regard, foam-core composites have found particular beneficial application in aerospace applications where low density materials are particularly beneficial.

Reticulated honeycomb and blown-foam materials have preceded foam-core composites as first and second generation synthetic materials, respectively, which have been widely used as structural materials in the aerospace industry.

First generation reticulated honeycomb materials generally have been polymeric materials manufactured in sheet form. These materials derived their low density, and thus their desirability, principally from the numerous open spaces or voids that separate the interconnected walls of the material. The reticulated honeycomb material functions well as a structural filler particularly when sandwiched and adhesively bonded between planar facing sheets or skin materials.

However, reticulated honeycomb also has shortcomings, such as its resistance to deformation. Because the material is only slightly bendable, it is unsuitable, without modification, for use in applications requiring complex shaping and acute bending as is commonly required of component parts used in aerospace applications such as intake and exhaust ducting and the like. Adapting reticulated honeycomb to such applications where complex shaping and acute bending is required has previously required that the material be "stress-scored" to make it conformable. Scoring honeycomb, however, diminishes the integrity and strength of the material and often requires that a cementitious filler be applied within the score to restore some of the structural integrity of the honeycomb. The inclusion of filler materials of this sort are not altogether desirable in that they present the possibility of delamination with the passage of time and can also impart undesirable electrical properties to the overall component in which the honeycomb is used.

The second generation expanded foam-core materials typically comprise synthetic thermoplastic resins which include polyurethane foams and expanded polystyrene. These expanded or "blown" foams achieve their open, macrocellular structure usually by incorporation of a volatile blowing agent such as pentane which causes the material to expand when sufficiently heated.

Although expanded foams have demonstrated desirable strength and insulating characteristics, such materials are generally resistant to shape conformation as is the honeycomb. Thus, expanded foams are usually best suited for applications requiring a flat, sheet material.

Another drawback relating to expanded foams relates to their tendency to expand and contract when exposed to humid and arid conditions, respectively. This sponge-like behavior is undesirable as it causes the material to increase in weight and density substantially when wet and, with repeated expansion and contraction, often results in material disintegration and delamination from facing materials to which the forms are typically adhered.

Syntactic foams are third generation materials which are believed to provide substantially improved characteristics when compared to the features associated with predecessor synthetic structural and filler materials as described above.

Generally, syntactic foams are composite materials comprised of rigid, hollow microspheres which are adhered to one another by a bonding agent. Syntactic foams differ from blown foams, such as polystyrene foam or polyurethane foam, in that the cells of syntactic foams are formed by the incorporation of small diameter, rigid microspheres into a bonding agent (typically a resin binder) rather than by expansion of the foamed material by a volatile blowing agent such as pentane. Further, voids are created between the microspheres provided that the bonding agent does not completely fill these spaces.

The bonding agents typically used in making syntactic foams are either thermosetting resins or thermoplastic resins. Examples of the thermosetting resins used as bonding agents include epoxy resins, bismaleimides, cyanates, unsaturated polyesters, non-cellular polyurethanes, thermosetting polyimides and the like. Typical examples of thermoplastic resins used as bonding agents include polyaryletherketones, polyphenylenesulfide, polyimides, polyetherimides and aromatic and aliphatic nylons.

Microspheres, which are also referred to as microbubbles, are generally rigid, hollow spheres of glass, carbon, polystyrene or phenolic resins. Among the most commonly used hollow spheres are glass microspheres which are available commercially in particle densities ranging from about 0.1 to about 0.6 gm/cc and diameters within the range of about 5 to about 200 microns.

Methods are known in the art for making "loaded" syntactic foam-core materials which have increased radar absorption capability. The loaded materials are formed of dielectric materials which are presented in a characteristic web-like structure that enhance the overall radar absorption of the material.

Various disclosures of prior art syntactic foam-core materials and the methods for making these materials are provided in the following U.S. Pat. Nos.: 4,410,639 to Bouley, et al.; 4,412,012 to Bouley, et al.; 4,482,590 to Bouley, et al.; 4,548,861 to Barnes, et al.; 4,568,603 to Oldham; 4,595,623 to Du Pont, et al.; 4,861,649 to Browne; 4,956,393 to Boyd, et al.; 5,120,769 to Dyksterhouse, et al.; 5,135,959 to Hill; 5,167,870 to Boyd, et al.; 5,185,381 to Ruffoni; 5,252,632 to Savin; and 5,356,958 to Matthews. All of the foregoing patents are herein incorporated by reference.

The related references in the art indicate that considerable effort has been directed toward formulating strong and low density syntactic foam-core materials which are capable of being loaded with electromagnetic attenuating fillers. None of the above-identified disclosures, however, reveals a highly shape-mutable syntactic foam-core material that is characterized by high strength, ultra-low density, broad temperature range utility and electromagnetic attenuation tailorability and which is relatively simple and inexpensive to produce and does not require sophisticated manufacturing equipment. Thus, the related art notwithstanding, a need which is unsatisfied by known technology exists within the art for the present invention which accomplishes these and other advantageous objectives.

SUMMARY OF THE INVENTION

Briefly, therefore, the present invention is direct to a novel syntactic foam-core material and method for making same. The material is prepared by thoroughly combining a resin, a solvent and microspheres in a closed system mixer to form a slurry in which the resin, solvent and microspheres are substantially uniformly dispersed. This material may be stored or processed to either an intermediate or a fully cured state by either partially or fully extracting the solvent from the mixture. Further, various adjuvants including carbon particles may be added to the slurry to alter the properties of the fully cured composite.

Among the several advantages found to be achieved by the present invention, therefore, may be noted the provision of a substantially reduced density syntactic foam-core composite; the provision of an uncured material which may be stored for more than five years without adverse effects; the provision of a partially cured material which may be stored for more than one year without adverse effects; the provision of a partially cured material which is sufficiently pliable for manipulation to a final shape prior to full curing; and the provision of a material which is tailorable to various electromagnetic attenuations, costs and useful temperature ranges.

DESCRIPTION OF THE DRAWINGS

Further objects and features of the present invention are revealed in the following Detailed Description of the Preferred Embodiment of the invention and in the drawing figures wherein.

DETAILED DESCRIPTION OF THE PREFERRED EMBODIMENT

Figure 1:
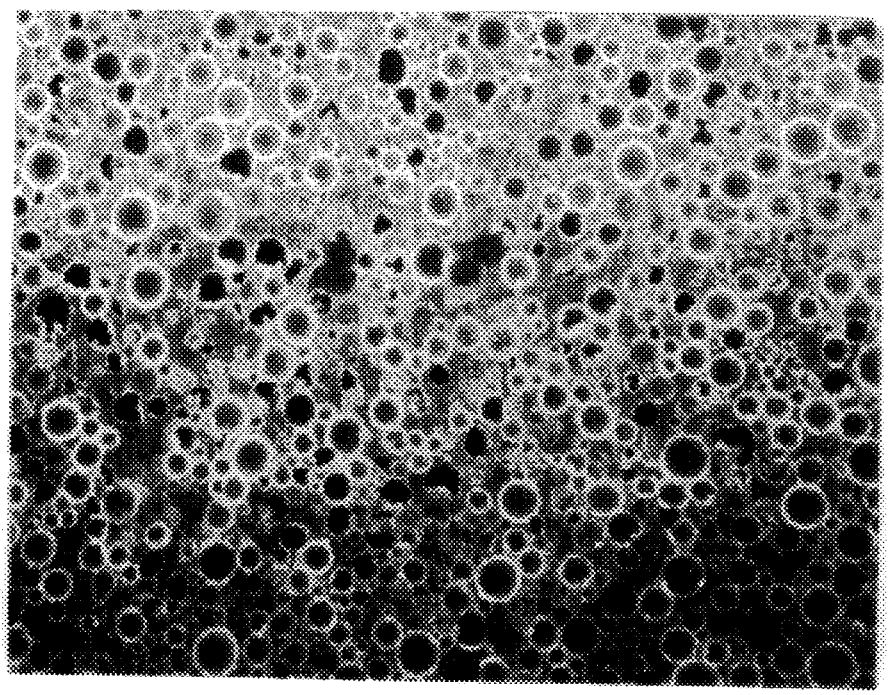
FIG. 1 is a photomicrograph taken a 100 times magnification showing the structure of a syntactic foam-core material of the present invention.

In accordance with the present invention, it has been discovered that combining resin with a solvent and microspheres and extracting the solvent produces a syntactic foam-core material having a lower density than do typical prior art syntactic materials, presumably because random voids are formed between adjacent microspheres as the solvent is extracted. Surprisingly, it has also been found that partially extracting the solvent by vacuum and heating the material to partially advancing the resin produces a pliable "B staged" material which may be stored for more than one year before being formed to a desired shape and extracting the remainder of the solvent. The material may be cast into a billet for later machining, molded to near net shape, formed into sheets or other stock shapes, or produced as a B staged material which may be stored for later use.

In accordance with the present invention, starting materials include a suitable resin, microspheres and solvent. The resin and microspheres may be those used in the prior art techniques as described in the U.S. Patents cited above. The resin is preferably a synthetic organic resin such as an epoxy, a cyanate ester or a polyimide resin. However, silicones, bismaleimides, and other thermosetting and thermoplastic resins can be used. The microspheres may be any available microspheres such as polymer, glass, quartz or carbon spheres and are preferably hollow glass spheres which are filled with a gas such as carbon dioxide and which have a diameter between about 5 and about 200 microns. The solvent may be selected from among a wide variety of liquids and particularly from among organic solvents. Preferred solvents include methyl ethyl ketone (MEK), aliphatic naphtha, methanol and methyl 2-pyrrolidinone.

If desired, chopped fiberglass may be combined with the resin, solvent and microspheres to inhibit propagation of cracks. Other adjuvants may also be added to the resin systems if desired. Ordinarily skilled artisans will readily understand which adjuvants to select and what relative proportions to add. Examples of these adjuvants include nadic methyl anhydride (NMA), which is a high temperature stabilizer that enables the material to withstand higher temperatures without degradation. Rubber tougheners may also be added to increase the toughness of the material and to make it less brittle and more impact resistant. Further, flame retardants such as brominated compounds and in particular BC-58 available from Great Lakes Chemical Company may be added to resist ignition of the syntactic foam-core material.

Also, as will be explained in greater detail below, a particulate carbon filler such as EC 600JD Ketjen Black may be added to enhance the dielectric properties which in turn reduces the radar absorptivity of the material for low observable (LO) applications such as "stealth" aircraft. Ketjen is a U.S. federally registered trademark of the Akzo Chemical B.V. The particulate carbon may be ultrasonically dismembrated in a compatible low-viscosity medium prior to being added to the syntactic form-core material to create tailored, radar absorbing structure for low observable treatments. Still further, other fillers may be added such as inorganic compounds, metals, metal oxides, pyrolized graphite, precision cut carbon fibers and other exotic materials.

Although many different resins, solvents, microspheres, and additives may be used to produce the composite material, the relative proportions of the constituents before any extraction of the solvent are the same, namely 50 to 60 parts by weight resin, 35 to 43 parts by weight microspheres, about 7 to about 10 parts total solids content by weight solvent and, optionally, 0 to 10 parts by weight chopped fiberglass and 0 to 12 parts by weight electromagnetic media such as carbon particulate. More desireably, the relative proportions are 53 to 58 parts by weight resin, 39 to 42 parts by weight microspheres, about 7 to about 10 parts total solids content by weight solvent and, optionally, 1 to 5 parts by weight chopped fiberglass and 0 to 12 parts by weight electromagnetic media. Preferably, the relative proportions are about 56 parts by weight resin, about 41 parts by weight microspheres, about 8 parts total solids content by weight solvent and, optionally, about 3 parts by weight chopped fiberglass and 0 to 12 parts by weight electromagnetic media. It should be understood that these ratios have been found to be optimal for reduced material density, but other proportions are also intended to be within the scope of this invention.

In particular, the syntactic foam-core material may be produced as follows. About fifty-six parts by weight of the resin are mixed together with seven to ten and preferably about eight parts by total solids content weight of solvent by stirring in a closed system to form a viscous liquid. About forty-one parts by weight of microspheres and various amounts of other optional ingredients such as three parts by weight of chopped fiberglass are then slowly added to the resin-and-solvent mixture and blended to assure that no agglomeration occurs. In the preferred embodiment, the solid ingredients such as the microspheres and fiberglass are added in stages and thoroughly blended into the mixture before more solid ingredients are added. The blending is performed at low speeds to avoid breakage of the microspheres. For a 3000 gm (approximately five gallon) batch blended in a planetary mixer, ten minutes of mixing at low speed during each ingredient addition stage has been found to achieve substantially uniform dispersion of the ingredients and eliminate agglomerates without causing excessive microsphere breakage.

The mixing may be performed as either a batch or continuous process. Once the microspheres and adjuvants are sufficiently interspersed in the mixture, the material may be: processed immediately by molding and curing; stored as a uncured, bulk material for later processing; or stored as a partially cured, B staged material for later use.

If the mixture is processed immediately, it is cast into an appropriately-shaped mold to form either a billet, a stock shape or a near net shape component. The above-described mixture may then be packed into an appropriately shaped mold which has been treated with a suitable releasing agent or release film such as a FREEKOTE 700, 33 NC or 815 NC mold release agent. FREEKOTE is a U.S. federally registered trademark of The Dexter Corp.

The material is then cured by extracting the solvents under vacuum, heat, pressure or a combination of all. Depending upon the particular resin and solvent system used, the molded product may be cured fairly quickly by evaporation at room temperature. If the resin and solvent system will not "self cure" at room temperature, the mold may be placed in a vacuum bag and the bag may be de-pressurized to facilitate the solvent removal. In addition, the bag and material-filled mold may be placed in an autoclave so that a series of temperatures and pressures as desired can be applied to further cure the material. Once the material is sufficiently cured, the mold may be removed from the autoclave and vacuum bag, and the material may be removed from the mold. The cured material may then be machined and shaped using standard techniques which are well known in the art to produce a part having final component dimensions.

If the material is to be stored as a B staged material, the material may be placed in a vacuum bag which is then sealed before a vacuum pressure of at least 25 in Hg and as much as 29.9 in Hg is pulled for a length of time sufficient to remove greater than one half (approximately 51 percent) of the solvent. This is performed using vacuum and heat to partially advance the resin thereby yielding a highly conformable, pliable sheet. Obviously, the larger the amount of material, the longer the period of time the vacuum must be maintained before a sufficient amount of the solvent is removed.

If the material is to be stored in the partially cured state rather than immediately used, the material is simply placed in a hermetically sealed container after being mixed. No vacuum, heat or pressure should be applied, although it is desirable to remove the excess air from the container to prevent evaporation of the solvent. Further, although refrigeration may not be necessary when the product is intended for only short term storage, refrigeration is preferred when the storage is intended for longer durations. When properly sealed and cold-stored, the material has been held for periods greater than five years without any noticeable degradation or changes in properties for certain resins. However, the storage time is a function of the reactivity of the resin employed. Nonetheless, if the material is not properly stored as described above, it will become "crusty" and cannot be molded or shaped.

The B staged material is sufficiently pliable to permit bends having radii as sharp as four times the material thickness. This pliable character of the partially cured material has been found to be particularly advantageous in making complex shapes. Further, because various adjuvants may be added to the material, a laminate structure of sheets having differing qualities may be formed from the partially cured material before "co-curing" the laminate to form a finished part. For example, sheets of B staged material having gradually increasing dielectric properties may be laid up with a layer of adhesive film between each sheet of B staged material. This laminated structure may then be cured to bond the adhesive layers to the sheets of B staged material and extract the remaining solvent from the material. The resulting structure is a light weight part that has tailored electromagnetic properties through its thickness. Further, because of the pliable nature of the B staged material, the resulting dielectrically tailored structure may take a complex geometric shape.

One way of altering the dielectric properties of the syntactic foam-core material is to add electromagnetic media such as carbon particles as fillers to the material during the blending process. Before blending the particles into the material, they are dismembrated in a solvent. The typical solvent used in dismembration is methyl ethyl ketone (MEK), but other solvents may be used provided that the solvent is compatible with the base resin. The solvent is placed in a suitable container and the carbon filler such as EC 600JD Ketjen Black is mixed with the solvent in a 20:1 solvent-to-filler ratio. The solvent provides an adequate medium to breakdown the particulate carbon agglomerations to fine sub-micron particles which can move freely and form particle chains. These chains determine the dielectric properties of the material via chain link interactions when the ultrasonic vibrations of the dismembration tank are tuned to a particular frequency. When the Ketjen Black carbon particles are dismembrated in MEK, this tuned frequency is approximately 20 kHz. This frequency is high enough to disentangle the particulate carbon to form a web-like structure, but is low enough to prevent the carbon particle chains from separating.

Figure 3B:
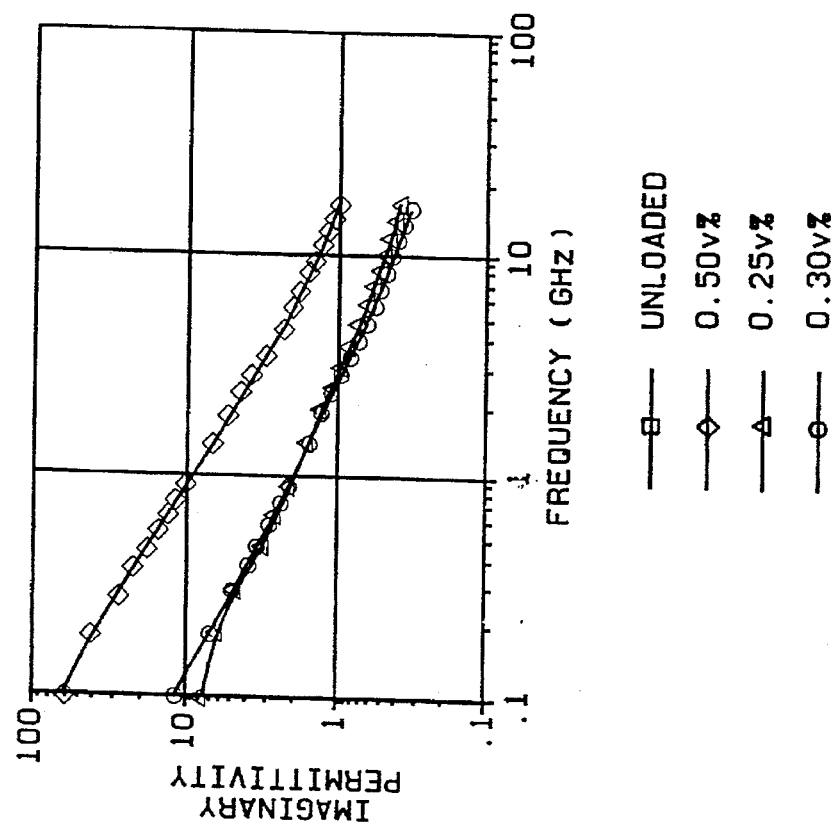
FIGS. 3A and 3B are, respectively, charts of the real and imaginary parts of permittivity of a loaded moderate temperature resin system material as a function of electrical frequency.
Figure 3A:
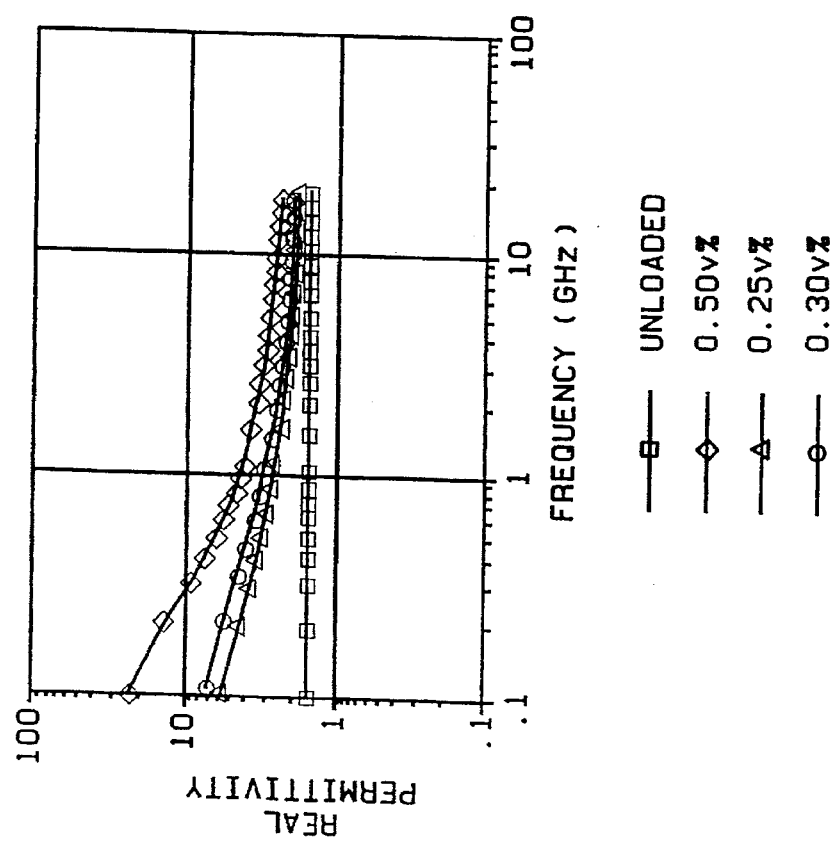

Once the carbon and solvent slurry is dismembrated as described above, it is added to the resin-solvent-microsphere mixture along with the chopped fiberglass to create a "loaded" version of the syntactic foam-core material. Once the loaded material is cured, the glass fibers and carbon particles set up tiny dipoles in the material which create spiking at various electrical frequencies which the designer may choose. By varying the amount of carbon added, the intensity of the spike will change. The resulting real and imaginary permittivities at various volume fractions of carbon filler as a function of frequency for a moderate temperature epoxy resin system are shown in FIGS 3A and 3B, FIG. 3A showing the real part of the permittivities and FIG. 3B showing the imaginary part.

Figure 2:
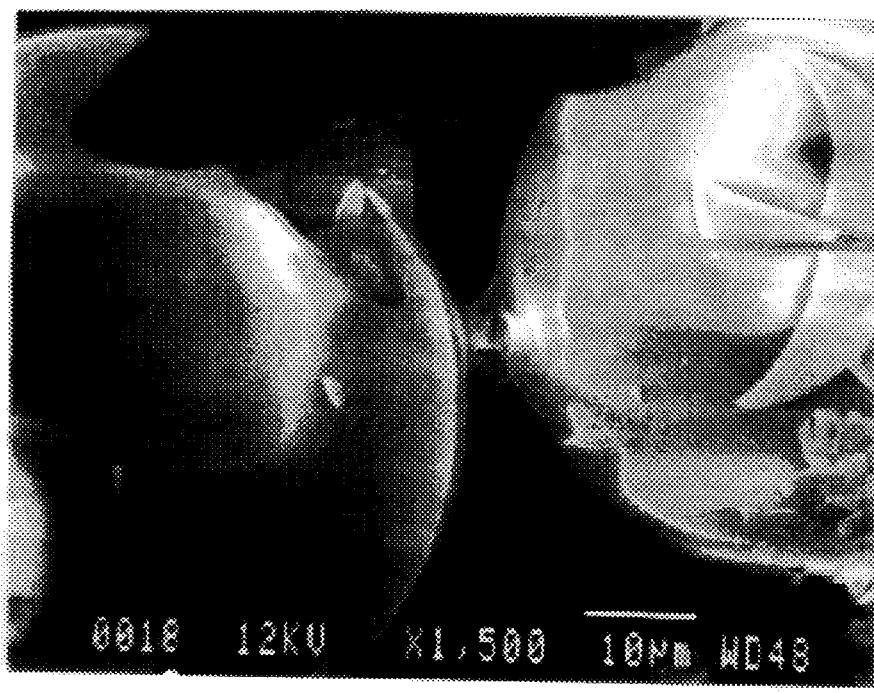
FIG. 2 is a photomicrograph taken a 1500 times magnification showing a detail of the structure of the syntactic foam-core material.

The syntactic foam-core material has ultra-low weight (below 0.35 gm/cc and even as low as 0.30 gm/cc and lower) due to the intersticial voids as shown in FIGS. 1 and 2. These voids are approximately 30 to 50 microns across. The solvent, prior to its removal from the foam core allows the microspheres to achieve maximum packing densities. Hence, as the photomicrographs of FIGS. 1 and 2 show, the syntactic material produced by the method of this invention is a network of resin coated microspheres that are tightly packed and spaced by controlled yet random voids to achieve a very low material density with isotropic mechanical as well as electrical properties, i.e., a structural bulk absorber.

Further, the radar absorption qualities of the material may be tailored to the requirements of the particular application. Depending upon the resin system used, the material has a range of temperature capabilities, strength capabilities, and costs. Although by no means exhaustive, several examples of different formulations of the syntactic foam-core materials and methods of making these materials of the present invention are provided below.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples. In the examples all percentages are given on a weight basis unless otherwise indicated.

Example 1, Unloaded Low Temperature Epoxy System

A low temperature epoxy resin was prepared from EPON 828 resin and a 3-diethylaminopropyl-amine (DEAPA) catalyst. EPON is a U.S. federally registered trademark of the Shell Chemical Corporation. The epoxy was mixed in a ratio of about 95 percent EPON 828 resin and about 5 percent DEAPA catalyst. Fifty-six parts of this epoxy was mixed with 8 parts by weight of total solids content of methyl ethyl ketone (MEK) and then 41 parts of microspheres and 3 parts of fiberglass were slowly added to the mixture. The microspheres used were SCOTCHLITE H20/1000 glass microspheres. SCOTCHLITE is a U.S. federally registered trademark of 3M Company. The fiberglass was No. 497 DB ⅛ inch milled D-glass fiber manufactured by Owens Corning Fiberglass.

Several different finished material thicknesses were made. Depending upon the material thickness, the curing procedure was varied to assure that a sufficient amount of solvent was removed throughout the entire thickness of material. For materials up to two inches thick, the material was heated gradually (at a rate of about ½° F. per minute) to about 160° F. and held under full vacuum for about four hours. For material thicknesses from two inches to six inches, the material was heated gradually to about 120° F. and held for about two hours, then heated to about 140° F. and held for about two hours, and then heated to about 160° F. for up to about four hours. For material thicknesses greater than six inches, the material was heated to about 105° F. for up to about four hours, then heated to about 120° F. for up to about two hours, then heated to about 140° F. for about two hours, and then heated to about 160° F. for up to about four hours.

Example 2, Unloaded Moderate Temperature Epoxy System

A moderate temperature epoxy resin system was made using EPON 9420 moderate temperature epoxy resin and EPON 9470 catalyst. The epoxy was mixed in a ratio of about 80.3 percent resin to about 19.7 percent catalyst or essentially in a ratio of 4:1. As with Example 1, fifty-six parts of epoxy was then mixed with 8 parts by weight of total solids content of methyl ethyl ketone (MEK) before 41 parts of SCOTCHLITE H20/1000 glass microspheres and 3 parts of No. 497 DB fiberglass were slowly added to the mixture.

To fully cure the moderate temperature epoxy system, the thoroughly mixed material was maintained under a full vacuum for approximately four hours prior to being heating gradually to approximately 175° F. under continued full vacuum pressure. The temperature and pressure were maintained at these levels for approximately one hour until the heat was increased to about 250° F. Once the 250° F. was obtained, a pressure of about 15 psi was exerted on the exterior of the vacuum bag and this condition was held for about one hour. Next, the temperature was increased to about 300° F. and held for about one hour, then to about 350° F. and held for about four hours. The material was then slowly cooled to room temperature at a rate of no greater than about 1° F. per minute. Once room temperature was achieved, the pressure and vacuum were released and the finished molded product was removed. The finished product had a higher temperature capability than the low temperature epoxy resin system but cost slightly more to produce.

Example 3, Unloaded Cyanate Ester Resin System

To produce this material, Ciba-Geigy M-20 cyanate ester resin was combined with a cobatic acetylacetonate curing agent and dinonyl-phenol reactive diluent. These compounds were combined in a ratio of approximately 93.0 percent of cyanate ester high viscosity resin which is diluted to about 66 percent solids, about 6.0 percent dinonyl-phenol reactive diluent and about 0.16 to about 0.20 percent cobatic acetylacentonate curing agent. The catalyst formed from the supersaturated dinonyl-phenol solution was made at an elevated temperature of between about 80° and about 160° F. prior to adding it to the solvent. The solvent was made from MEK and naphtha in a ratio of about 8:1 MEK to naphtha. The cyanate ester resin solution was added to this catalyst-solvent solution and the mixture was thoroughly blended.

The mixture was cured much as the moderate temperature epoxy resin system except that a pressure of about 50 psi was exerted on the vacuum bag when the full vacuum was pulled in the bag and the mixture is gradually heated to about 175° F. and held for approximately one hour. Then, the material was gradually heated directly from about 175° F. to about 350° F. and held for approximately four hours. The material was cooled at a rate of no greater than about 1° F. per minute until room temperature was achieved. The fully cured cyanate ester composite material had a higher temperature capability than the moderate temperature epoxy resin system but at a higher material cost.

Example 4, Unloaded Polyimide Resin System

No curing agent was required for the polyimide resin system as the material automatically cured when heat and pressure were applied. AFR-700 polyimide resin produced by Hycomp AMSPEC Chemical Corporation was used to produce this system. Various viscosity polyimide resins having viscosities within the range of about 800 to about 2,000 cP were made. The polyimides were transformed to the various viscosities by dilution with methanol to achieve the desired viscosity range.

The solvent used with the polyimide resin system was about a 1:1 ratio of methanol and methyl-2-pyrrolidinone.

As before, the resin and microspheres were mixed in a weight ratio of about 56:41. The fully admixed material was cured by holding it under a full vacuum for four hours minimum and gradually heating the mixture to about 420° F. and holding that temperature for about three hours. Then, the material was heated to approximately 480° F. and held for about one hour. At the end of the hour, a pressure of about 55 psi was applied and the material was gradually heated to about 700° F. and held for a minimum of four hours. The material was cooled slowly (at a rate of less than about 1° F. per minute) to room temperature. The finished parts made from the polyimide were found to have the highest temperature capability of any of the resin systems previously described but also had the highest cost.

Examples 5–8, Loaded Syntactic Foam-Core Systems

Loaded syntactic foam-core materials were made using each the systems previously described as Examples 1–4. For a 3,000 grams batch of material with a carbon loading of 0.25 volume percentage, 45 grams of particulate carbon were added to 900 grams of MEK. This slurry was ultrasonically dismembrated for a minimum of 90 seconds. The dismembrated slurry was then introduced into the respective resin-solvent mixture described above and blended to form a homogeneous system. The processing then proceeded as in the respective unloaded version described above until the mixture was completed. However, once the mixing was complete, the mixer was sealed, restarted and a vacuum was drawn on the contents of the mixer to evacuate the mixer to above 25 in Hg to remove the solvent from the mixture. After about ten minutes of mixing under vacuum, the mixer was stopped, the vacuum was released and the material was removed. The material was weighed to assure that no more than ten percent solvent remained. If greater than ten percent solvent was present, the material was statically de-aired in a vacuum chamber until the target mass was achieved.

For the cyanate ester version described above, a 9:1 blend of MEK and naphtha was used as the dismembrating solvent. For the polyimide version described above, a 3:1 blend of methanol and n-methylpyrollidino (NMP) was used as the dismembrating solvent.

In view of the above, it will be seen that the several advantages of the invention are achieved and other advantageous results attained.

As various changes could be made in the above methods and compositions without departing from the scope of the invention, it is intended that all matter contained in the above description and shown in the accompanying drawings shall be interpreted as illustrative and not in a limiting sense.

While the present invention has been described by reference to a specific embodiment, it should be understood that modifications and variations of the invention may be constructed without departing from the scope of the invention defined in the following claims.

What we claim is:

1. A method for preparing a readily conformable, high strength, low density syntactic foam-core composite comprising the steps of:

(a) mixing 56 parts by weight of a resin and 8 parts by weight of a solvent for the resin to form a resin-solvent system;

(b) separately mixing 1.5 parts by weight particulate carbon and 30 parts by weight of a solvent for the resin to produce a slurry, dismebrating the resulting slurry, and blending the dismembrated slurry with the resin-solvent system to thereby form a loaded resin-solvent system;

(c) adding 41 parts by weight of microspheres and 3 parts by weight of fiberglass to the loaded resin-solvent mixture to thereby form a loaded resin-solvent-microsphere system;

(d) mixing the resin-solvent-microsphere system under vacuum to extract a portion of the solvent from the resin until no more than 10 but greater than 7 parts by weight of solvent remain to create a fully admixed system;

(e) at least partially curing the resin in the fully admixed system by extracting more than one-half of the remaining solvent.

2. The method of claim 1 wherein the step of at least partially curing the resin comprises the step of fully curing the resin.

3. The method of claim 1 wherein the step of at least partially curing the resin results in a partially cured resin, and further comprising the step of hermetically sealing the fully admixed system including the partially cured resin in a container.

4. The method of claim 1 wherein the step of at least partially curing the resin results in a partially cured resin, and further comprising the step of molding the partially cured, fully admixed system into a desired shape, followed by the extraction of a final portion of the remaining solvent.

* * * * *